(12) United States Patent
Lee

(10) Patent No.: US 6,900,398 B1
(45) Date of Patent: May 31, 2005

(54) FLOOR SCALES

(76) Inventor: Lanny R. Lee, 2410 Madrid Dr., Melbourne, FL (US) 32940

(*) Notice: Subject to any disclaimer, the term of this patent is extended or adjusted under 35 U.S.C. 154(b) by 0 days.

(21) Appl. No.: 10/910,978

(22) Filed: Aug. 4, 2004

(51) Int. Cl.$^7$ ............................................... G01G 19/52
(52) U.S. Cl. ........................................................ 177/142
(58) Field of Search .................................. 177/142, 238

(56) References Cited

U.S. PATENT DOCUMENTS

| | | | | |
|---|---|---|---|---|
| 640,740 A | * | 1/1900 | Braley | 177/128 |
| 1,883,496 A | * | 10/1932 | Berson | 177/142 |
| 1,887,986 A | * | 11/1932 | Baldwin | 177/142 |
| D183,069 S | * | 6/1958 | Spear | D10/92 |
| 2,872,178 A | * | 2/1959 | Holland | 177/142 |
| 3,187,826 A | * | 6/1965 | Traff | 177/142 |
| 4,126,197 A | | 11/1978 | Kechely | 177/145 |
| 4,288,131 A | * | 9/1981 | Griffin | 312/245 |
| 5,048,624 A | * | 9/1991 | Pike | 177/154 |
| 5,448,022 A | | 9/1995 | Rishel | 177/126 |
| 5,886,302 A | | 3/1999 | Bermanton | 177/199 |
| 5,892,180 A | | 4/1999 | Carey | 177/144 |
| 5,994,649 A | | 11/1999 | Garfinkle | 177/25.11 |
| 6,166,335 A | | 12/2000 | Soehle | 177/177 |
| 6,268,572 B1 | | 7/2001 | Wilson, Jr. | 177/126 |
| 6,407,351 B1 | * | 6/2002 | Meyer et al. | 177/238 |
| 6,583,369 B2 | | 6/2003 | Montagnino et al. | 177/177 |
| 6,603,082 B1 | * | 8/2003 | Delbruck et al. | 177/132 |
| 6,700,080 B2 | | 3/2004 | Stephens | 177/126 |
| 6,759,605 B2 | * | 7/2004 | Montagnino et al. | 177/238 |
| 6,781,067 B2 | * | 8/2004 | Montagnino et al. | 177/25.13 |

* cited by examiner

*Primary Examiner*—Randy W. Gibson

(57) ABSTRACT

The invention, an improved removable personal scale and a means to mount into a pit prepared in masonry or an opening in a framed floor while viewing is either or both direct or remote readout. This invention is an easily removed and replaced scale having a planar platform that is made substantially flush to the floor surface and easily covered with a surface to match or contrast the surrounding floor surface and provides for an air gap around the perimeter. Also, as provided by this invention is a means to substantially support and align this removeable scale. Finally, the invention includes a means to seal the air gaps to exclude entry objects.

17 Claims, 3 Drawing Sheets

FLOOR SCALES

BACKGROUND

This invention relates to institutional or home devices related to weighing persons both standing and those using wheelchairs or walking aids. In home weighing devices often are taken out and then stored after use. While, others are set aside or tipped up after use and are removed for room cleaning, this becomes difficult in the case of heavy beam type scales. Either being carried away and having a dropping hazard or moving which can cause damage to the floor need space. Distracted people easily trip over these types of scales often causing foot injuries or worse. This can easily happen especially in darken rooms when portable scales are not put away. People with disabilities usually need special care to get up on the platforms and use these scales. This height differential sometimes makes use of these scales impractical and requires placing people in slings or on platforms while another solution is to install sensors in gurneys. Other scales U.S. Pat. No. 5,448,022 to Rishel and U.S. Pat. No. 4,126,197 to Kechely need special ramps ending in cleats to maintain position on the scale. Another idea is to make a scale transparent as with U.S. Pat. No. 5,886,302 to Germanton which does not address the problem dealing to keep glass clean in the bathroom environment. To alleviate the readout problem, U.S. Pat. No. 6,700,080 to Stephens, uses a tilt readout and U.S. Pat. No. 6,583,369 to Montagnimo, uses a transiently visible readout.

SUMMARY

My invention clearly is not intrusive and has a remote or direct readout that is easily placed for optimal viewing. Also, included in this invention is a means to adapt a pit or opening to accurately and repeatedly receive the scale while aligning to the surface and the opening. Both, existing and new structures having framed or masonry floors, are readily adapted to receive his invention. This unique scale is easily removed and replaced as needed.

DRAWINGS

DESCRIPTION

Figure 1:
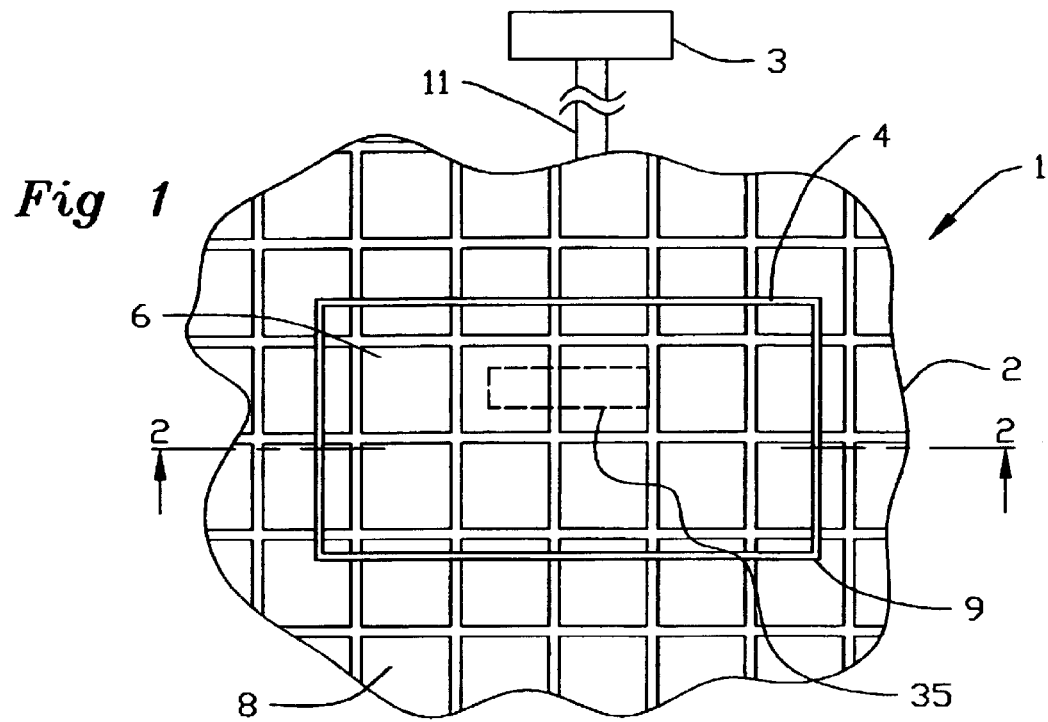
FIG. 1 is an overhead view of the scale.

FIG. 1 is the overhead view of the floor showing the floor scales 1 in floor 2 and an opening 9 with a perimeter gap 4 to permit movement of deck 6. Floor surface is shown as square pattern 8 and weight readout 3 has connection 11 to floor scale 1.

Figure 2:
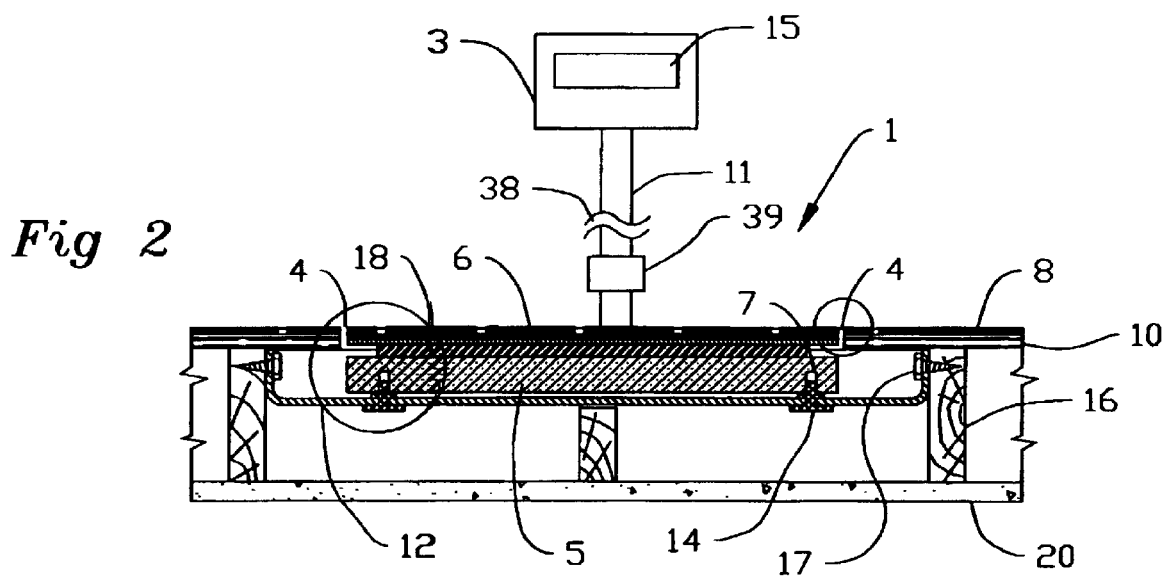
FIG. 2 is a section view taken from FIG. 1.

FIG. 2 is section view of floor scale 1 showing perimeter gap 4 and floor covering 6 with sub floor decking 10. Weight is read indicator 15 on remote weight readout 3 which have connection 11 and preferred connector 39 and schematic service loop 38 and direct readout 35 is also shown. Floor beam 16 with ceiling 20 is an example of framed type structure installation in which support tray 12 is secured to frame 16 by a plurality of fasteners 17. Scale frame 5 having plurality of holes 7 to receive pin 14 being a slip fit. Thereby, positional reference is maintained for a perimeter gap 4.

Figure 2A:
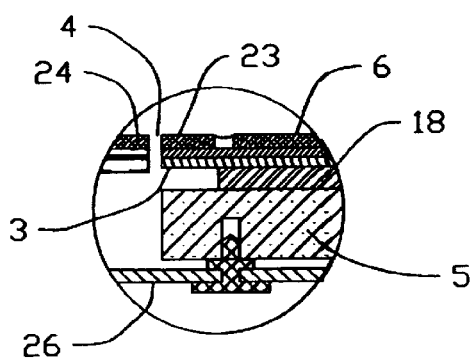
FIG. 2a is an enlarged section view taken from FIG. 1.
Figure 2B:
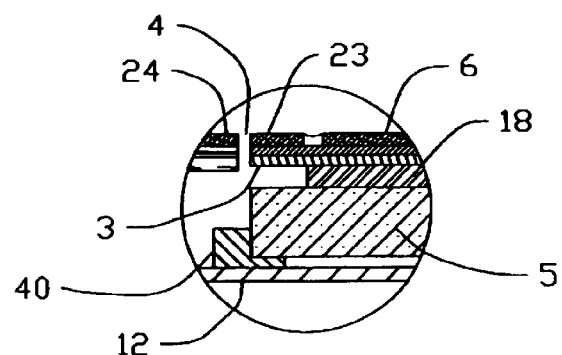
FIG. 2b is an enlarged section view taken from FIG. 1 showing another embodiment.
Figure 3:
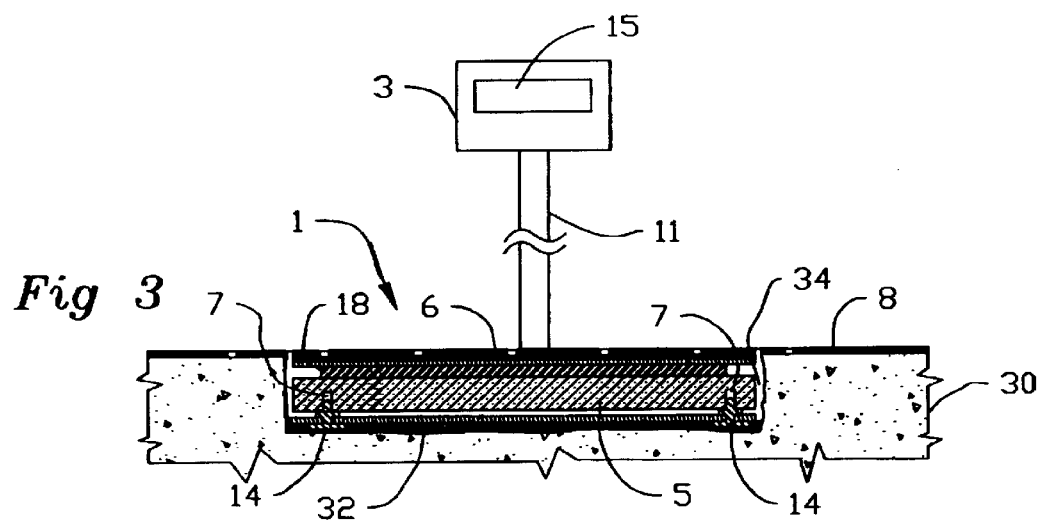
FIG. 3 is also the section view from FIG. 1 showing a masonry floor.
Figure 2C:
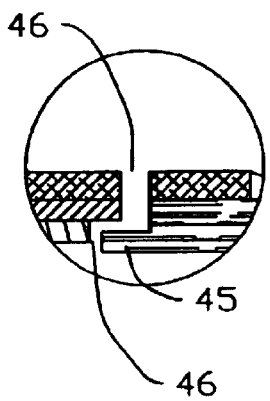
FIG. 2c is an enlarged section view taken from FIG. 1 showing another lap air gap.
Figure 2D:
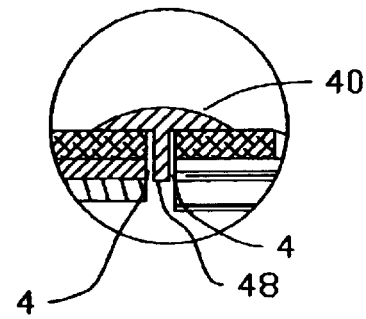
FIG. 2d is an enlarged section view taken from FIG. 1 showing shield.

FIG. 2a demonstrates and alignment of platform 6 surface 23 and floor 2 having a floor surface 24 providing for a perimeter gap 4. Floor scale 1 comprises of frame 5, pressure sensor 18 and deck 6 with optional floor covering 8. FIG. 2b shows another method of providing for alignment of floor scale 1 by means of abutment 40 secured to support tray 12 to maintain perimeter gap 4 between deck 6 and floor 2. FIG. 2c shows an offset air gap 46 and projection 45. FIG. 2d shows shield 40 with tenon 48 loosely fit to air gap 4. FIG. 3 is a masonry floor 30 with pit 34 providing space to accept floor scale 1 and plate 32 having plural pin 14 secured to the pit 30 received by slip fit to plural hole 7 in bottom of scale fire 5 and thereby maintain perimeter gap 4.

Figure 5:
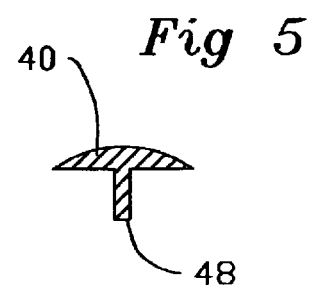
FIG. 5 is an enlarged section view taken from FIG. 4.
Figure 4:
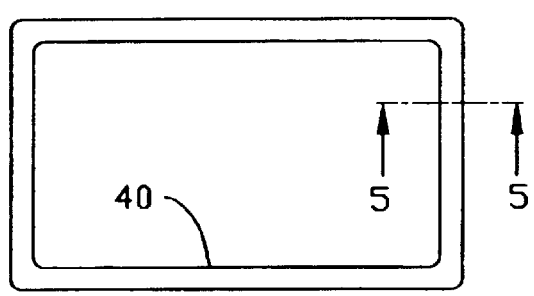
FIG. 4 is an view showing shield embodiment.

In FIG. 4 is shown a top view of shield 40 and FIG. 5 is an enlarged section of shield 40 showing tenon 48.

We claim:

1. A removable planar platform weighing scale with alignment structures to comprising:
   a having alignment features is secured to floor structures below an opening in the floor surface to removable receive and align a planar platform weight scale having respective alignment features on the lower surfaces such that the planar platform is mostly flush to the surrounding floor and an air gap is maintained around the perimeter of said deck to said opening.

2. The weighing scale of claim 1, wherein the alignment feature is vertical protruding pins installed in the bottom surface of scale and the respective sockets to removably receive the pins are located in the support tray.

3. The weighing scale of claim 2, wherein the alignment pins are installed directly into the floor frame structure and the respective sockets are located in the lower surface of the scale.

4. The weighing scale of claim 2, wherein the alignment sockets are installed the floor frame structure and the respective pins are located in the lower surface of scale.

5. The weighing scale of claim 2, wherein the alignment curbs installed the floor frame structure and the respective pins are located in the lower surface of scale.

6. The weighing scale of claim 2, wherein the vertical abutments are located in the support tray and the respective vertical abutting located along the lower surface of scale.

7. The weighing scale of claim 2, wherein the alignment is accomplished by mean of a combination of pins and sockets in conjunction with and abutments.

8. The weight scale of claim 1, a having alignment features is secured to a pit in a masonry floor below an opening in the floor surface to removable receive and align a platform deck weight scale having respective alignment features on the lower surfaces such that the deck is mostly flush to the surrounding floor and an air gap is maintained around the perimeter of said deck to said opening.

9. The weighing scale of claim 8, wherein the alignment feature is vertical protruding pins located in the support tray secured to the pit located in the masonry floor; and respective sockets bottom surface of scale to removably receive the pins.

10. The weighing scale of claim 8, wherein the alignment feature is sockets located in the support tray secured to the pit located in the masonry floor; and respective vertical pins located in the bottom surface of scale to be removably inserted into the respective sockets.

11. The weighing scale of claim 8, wherein the alignment feature is vertical abutments located in the sup ort tray; and respective butting surfaces located on respective vertical surfaces of scale.

12. The weighing scale of claim 8, wherein the alignment feature is vertical abutments located on vertical walls of the pit; and respective butting surfaces located on respective vertical surfaces of scale.

13. The weighing scale of claim 1, wherein the readout is located in the deck surface of the scale.

14. The weighing scale of claim 1, wherein the readout is located at a remote location.

15. The weighing scale of claim 1, wherein the support tray is clamped to the floor frame.

16. The weighing scale of claim 1, wherein the support tray is bonded to the floor frame.

17. The weighing scale of claim 1, wherein the air gap has shield.

* * * * *